(12) United States Patent
Takamido et al.

(10) Patent No.: US 10,138,314 B2
(45) Date of Patent: Nov. 27, 2018

(54) RUBBER GRAFT COPOLYMER, AND THERMOPLASTIC RESIN COMPOSITION CONTAINING RUBBER GRAFT COPOLYMER

(71) Applicant: KANEKA CORPORATION, Osaka-shi, Osaka (JP)

(72) Inventors: Seigo Takamido, Takasago (JP); Toyohisa Fujimoto, Takasago (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 14/394,703

(22) PCT Filed: Apr. 17, 2013

(86) PCT No.: PCT/JP2013/061374
§ 371 (c)(1),
(2) Date: Oct. 15, 2014

(87) PCT Pub. No.: WO2013/157569
PCT Pub. Date: Oct. 24, 2013

(65) Prior Publication Data
US 2015/0065651 A1    Mar. 5, 2015

(30) Foreign Application Priority Data

Apr. 18, 2012 (JP) ................................ 2012-094701

(51) Int. Cl.
| | | |
|---|---|---|
| C08F 279/02 | (2006.01) | |
| C08F 6/22 | (2006.01) | |
| C08L 51/04 | (2006.01) | |
| C08L 67/00 | (2006.01) | |
| C08L 69/00 | (2006.01) | |
| C08F 279/06 | (2006.01) | |
| C08L 67/02 | (2006.01) | |

(52) U.S. Cl.
CPC .............. *C08F 279/06* (2013.01); *C08F 6/22* (2013.01); *C08F 279/02* (2013.01); *C08L 67/02* (2013.01); *C08L 69/00* (2013.01); *C08L 2205/03* (2013.01); *C08L 2207/53* (2013.01)

(58) Field of Classification Search
CPC ........ C08F 279/02; C08F 279/06; C08F 6/22; C08L 2207/53
See application file for complete search history.

(56) References Cited

U.S. PATENT DOCUMENTS

| | | | |
|---|---|---|---|
| 5,708,093 A * | 1/1998 | Bastelberger | ........... C04B 26/32 523/201 |
| 6,545,089 B1 | 4/2003 | DeRudder et al. | |
| 7,393,896 B2 | 7/2008 | DeRudder et al. | |
| 8,415,008 B2 | 4/2013 | Ito et al. | |
| 2003/0203990 A1 | 10/2003 | DeRudder et al. | |
| 2004/0063824 A1 | 4/2004 | Takagi et al. | |
| 2010/0028657 A1 | 2/2010 | Ito et al. | |
| 2010/0144938 A1* | 6/2010 | Seidel | ..................... C08L 69/00 524/152 |
| 2011/0160338 A1 | 6/2011 | Lyons et al. | |

FOREIGN PATENT DOCUMENTS

| | | |
|---|---|---|
| CN | 1487976 A | 4/2004 |
| EP | 0519097 A1 | 12/1992 |
| EP | 0936244 A2 | 8/1999 |
| JP | 11-158365 A | 6/1999 |
| JP | 11-240995 A | 9/1999 |
| JP | 2000-204128 A | 7/2000 |
| JP | 2005-048067 A | 2/2005 |
| JP | 2007-112829 A | 5/2007 |
| JP | 2007-211108 A | 8/2007 |
| JP | 2007-277368 A | 10/2007 |
| JP | 2010-222553 A | 10/2010 |
| KR | 20110032314 A * | 3/2011 |
| WO | 2008/102536 A1 | 8/2008 |
| WO | 2010/025040 A1 | 3/2010 |

OTHER PUBLICATIONS

International Search Report dated Jul. 23, 2013, issued in corresponding application No. PCT/JP2013/061374.
Partial Supplementary European Search Report dated Nov. 5, 2015, issued in counterpart European Patent Application No. 13778689.3. (7 pages).
"Modern Polyesters", edited by John Scheirs, Timothyl E. Long, translated by Zhao Guoliang et al., 2007, pp. 375-378, with English translation. (12 pages).
Extended (Supplemental) European Search Report dated Mar. 9, 2016, issued in counterpart European Patent Application No. 13778689. 3. (12 pages).

* cited by examiner

Primary Examiner — Irina S Zemel
Assistant Examiner — Jeffrey S Lenihan
(74) Attorney, Agent, or Firm — Westerman, Hattori, Daniels & Adrian, LLP

(57) ABSTRACT

The present invention relates to a thermoplastic resin composition comprising a rubber graft copolymer comprising a core layer containing a rubber copolymer and a shell layer grafted on the core layer and a thermoplastic resin comprising a polycarbonate resin and an aliphatic polyester resin in the mass ratio of the rubber graft copolymer/the thermoplastic resin of 3/100 or more, wherein the shell layer is obtained by polymerizing or copolymerizing a (meth)acrylate monomer having an epoxy group, and the amount of the (meth)acrylate monomer having an epoxy group is 3 parts by mass or more and less than 29 parts by mass based on 100 parts by mass of the rubber graft copolymer. The thermoplastic resin composition of the present invention can be utilized in various applications.

6 Claims, No Drawings

RUBBER GRAFT COPOLYMER, AND THERMOPLASTIC RESIN COMPOSITION CONTAINING RUBBER GRAFT COPOLYMER

TECHNICAL FIELD

The present invention relates to a rubber graft copolymer useful for the improvement of the impact resistance of the thermoplastic resin. For example, the present invention relates to an impact resistance modifier capable of providing the composition containing a resin having an ester bond such as a polycarbonate resin with the heat stability. Especially, the present invention relates to an impact resistance modifier capable of improving the compatibility and the dispersibility of the alloy resins, besides the impact resistance and the appearance of the surface of the molded product by the addition to the alloy resins, and a thermoplastic resin composition containing the same.

BACKGROUND ART

In order to improve the impact resistance of the resin composition containing the aromatic polycarbonate resin and the like, the impact resistance modifier containing a rubber component has been added. When the usefulness of the impact resistance modifier containing various rubber components is compared, the great differences of the heat stability is often found in the case of high molding temperature and heat resistant test during a long period of time.

Recently, the technologies that the resin composition containing the aromatic polycarbonate is processed as thin and light molded products has been developed in the market. In the case of processing as the thin and light molded product, molded products satisfying various properties cannot be obtained when the fluidity of the resin composition containing the aromatic polycarbonate resin is lower, and the high molding temperature is needed to improve the fluidity of the resin composition containing the aromatic polycarbonate resin. In addition, in the resin composition containing the aromatic polycarbonate resin to which the impact resistance modifier containing the rubber component is added, the rubber component is easily deteriorated under the high temperature, and the defects of the appearance often causes due to the decrease of the mechanical properties and the discoloration.

Generally, in molding of the resin composition containing the aromatic polycarbonate resin, it is known that emulsifiers other than fatty acid emusifiers are suitable as a polymerizable emulsifier used in the manufacture of the impact resistance modifier capable of providing the impact resistance without decreasing mechanical properties (for example, patent documents 1 and 2).

In these patent documents, the impact resistance modifier manufactured by using a sulfonate polymerizable emulsifier has been disclosed. However, especially when the resin composition containing the aromatic polycarbonate resin including the impact resistance modifier disclosed in these patent documents is molded in the range of high temperature, it is not necessarily sufficient to exhibit the heat stability (mechanical properties, discoloration) and the impact resistance. In addition, it is also not sufficiently satisfactory to exhibit the quality retaining properties in the wet heat test during a long period of time.

In addition, patent document 3 discloses technologies that the ratio of melting viscosity of the polylactic acid resin and the thermoplastic resin other than the polylactic acid resin is controlled, and the core-shell type rubber having a glycidyl group in the outermost layer is used in order to improve the impact resistance, the heat resistance and the appearance. In the patent document 3, the amount of the glycidyl group of the outermost layer as well as the ratio of the shell layer and the core layer are unclear. When the present inventors studied the technologies of the patent document 3, it was found that it was necessary to further improve the appearance and the impact resistance of the molded product and the like. From these, it is desirable that the impact resistance modifiers providing the good impact resistance, the heat stability and the appearance having the decreased pearl gloss of the molded product obtained by especially molding at the high temperature, or providing the wet heat aging resistance for a long period of time, and the thermoplastic resin composition containing the impact resistance modifier has been developed.

PRIOR ART DOCUMENTS

Patent Documents

Patent document 1: JP2007-277368
Patent document 2: JPH11-158365
Patent document 3: JP2010-222553

SUMMARY OF THE INVENTION

Problems to be Solved by the Invention

The problem of the present invention is any of the following ones or a combination thereof. One problem of the present invention is to provide a rubber graft copolymer useful for both the impact resistance and the appearance of the molded product from the thermoplastic resin in the high level. Another problem of the present invention is to provide an impact resistance modifier capable of providing the molded product obtained by molding a resin composition containing a resin having an ester bond such as a polycarbonate resin at a high temperature with the heat stability, and providing the wet heat aging resistance for a long period of time, and a thermoplastic resin composition containing the same. In addition, another problem of the present invention is to provide an impact resistance modifier capable of improving the compatibility and the dispersibility of the alloy resins, besides the impact resistance and the appearance having the decreased pearl gloss of the molded product by the addition to the alloy resin, and a thermoplastic resin composition containing the same.

Solution to the Problems

The present inventors have been intensively studied to in order to solve the problems. As a result, it was found that, by using a given rubber graft copolymer, the impact resistance and the appearance of the molded product obtained from the resin composition containing the resin having an ester bond such as the polycarbonate resin can be satisfied at high level.

In addition, it was found that, by using other given rubber graft copolymer, the impact resistance modifier capable of providing the molded product obtained by molding the resin composition containing the resin having an ester bond such as the polycarbonate resin at a high temperature with the heat stability, and providing the wet heat aging resistance for a long period of time, and the thermoplastic resin composition containing the same can be provided.

Further, it was found that, the impact resistance modifier capable of improving the compatibility and the dispersibility of the alloy resins, besides the impact resistance and the appearance having the decreased pearl gloss of the molded product by the addition to the alloy resins, and the thermoplastic resin composition containing the same can be provided. Like these, the present invention(s) were completed.

Specifically, the present invention is as follows:

[1] A thermoplastic resin composition comprising a rubber graft copolymer comprising a core layer containing a rubber polymer and a shell layer grafted on the core layer, and a thermoplastic resin comprising a polycarbonate resin and an aliphatic polyester resin in the mass ratio of the rubber graft copolymer/the thermoplastic resin of 3/100 or more, wherein the shell layer is obtained by polymerizing or copolymerizing a (meth)acrylate monomer having an epoxy group, and the amount of the (meth)acrylate monomer having an epoxy group is 3 parts by mass or more and less than 29 parts by mass based on 100 parts by mass of the rubber graft copolymer.

[2] The thermoplastic resin composition according to [1], wherein the content of phosphorus is 10 ppm or more on a mass basis, and the content of an alkaline earth metal is 3000 ppm or less on a mass basis in the rubber graft copolymer.

[3] The thermoplastic resin composition according to [1] or [2], wherein a monomer forming the shell layer contains one or more kinds selected from a (meth)acrylate monomer having no epoxy group and a styrene monomer.

[4] The thermoplastic resin composition according to any one of [1] to [3], wherein the amount of the (meth)acrylate monomer having an epoxy group is 10 parts by mass or more and 100 parts by mass or less based on 100 parts by mass of the shell layer.

[5] The thermoplastic resin composition according to any one of [1] to [4], wherein the amount of the shell layer is 20 parts by mass or more and 55 parts by mass or less based on 100 parts by mass of the core layer.

[6] The thermoplastic resin composition according to any one of [1] to [5], wherein the rubber polymer is a diene polymer.

[7] The thermoplastic resin composition according to any one of [1] to [6], wherein the aliphatic polyester resin is a polylactic acid.

[8] A method for preparing a rubber graft copolymer comprising the steps of:

(a) preparing a latex containing a rubber graft copolymer by polymerizing at conditions of pH of 4.6 to 9.4 under the presence of an alkaline metal salt of a phosphate compound, (b) adding to the latex a solution containing an alkaline earth metal chloride to coagulate the copolymer, and (c) washing and drying the obtained coagulated substances.

[9] A rubber graft copolymer in which a shell layer obtained by polymerizing or copolymerizing a (meth)acrylate monomer having an epoxy group is grafted on a core layer containing a rubber polymer, and the content of phosphorus is 10 ppm or more on a mass basis, and the content of an alkaline earth metal is 3000 ppm or less on a mass basis.

[10] A rubber graft copolymer satisfying all of the following (1) to (3):

(1) the rubber graft copolymer polymerized under the presence of an alkaline metal salt of a phosphate compound (2) the rubber graft copolymer in which the phosphate compound does not remain as an alkaline earth metal salt in the rubber graft copolymer or in the case of remaining as the alkaline earth metal salt, the remaining amount of the alkaline earth metal salt of the phosphate compound is 3000 ppm or less as an alkaline earth metal on a mass basis (3) the rubber graft copolymer obtained by polymerizing at conditions of pH of 4.6 to 9.4.

[11] The rubber graft copolymer according to [10], wherein the content of phosphorus is 10 ppm or more on a mass basis.

[12] The rubber graft copolymer according to any one of [9] to [11], wherein the rubber polymer of the rubber graft copolymer is a polybutadiene or a poly(butadiene-styrene).

[13] The rubber graft copolymer according to any one of [9] to [12], wherein methyl methacrylate;

methyl methacrylate and other vinyl monomer;

vinyl cyanide monomer and aromatic vinyl monomer; or vinyl cyanide monomer, aromatic vinyl monomer and other vinyl monomer are graft-polymerized on the rubber polymer.

[14] The rubber graft copolymer according to any one of [9] to [13], wherein the alkaline metal salt of the phosphate compound is an alkyl phosphate salt, and/or an alkyl aryl phosphate salt.

[15] The rubber graft copolymer according to any one of [9] to [14], wherein the alkaline metal salt of the phosphate compound is a polyoxyalkylene alkyl ether phosphate salt.

[16] The rubber graft copolymer according to any one of [9] to [15], which has one kind or two or more kinds of reactive groups selected from an epoxy group, a hydroxy group, a carboxy group, an alkoxy group, an isocyanate group, an anhydride group, and an acid chloride group in a graft part.

[17] The rubber graft copolymer according to any one of [9] to [16], which is obtained by contacting a solution containing an alkaline earth metal chloride with a latex containing a rubber graft copolymer obtained by emulsion-polymerizing to coagulate the copolymer.

[18] The rubber graft copolymer according to any one of [9] to [17], wherein the rubber graft copolymer is washed with water and/or a solvent.

[19] The rubber graft copolymer according to any one of [9] to [18], wherein the rubber graft copolymer is a core-shell structure.

[20] The rubber graft copolymer according to any one of [9] to [19], which is used in a thermoplastic resin composition containing one kind or two or more kinds of resins selected from the group consisting of an aliphatic polyester resin, an aromatic polyester resin, and a polycarbonate resin.

[21] A thermoplastic resin composition comprising an aliphatic polyester resin, a polycarbonate resin, and the rubber graft copolymer according to any one of [9] to [19].

[22] A thermoplastic resin composition comprising an aromatic polyester resin, a polycarbonate resin, and the rubber graft copolymer according to any one of [9] to [19].

[23] A thermoplastic resin composition comprising ABS resin (acrylonitrile-butadiene-styrene resin), a polycarbonate resin, and the rubber graft copolymer according to any one of [9] to [19].

[24] The thermoplastic resin composition according to any one of [21] to [23], wherein at least one of the aliphatic polyester resin, the aromatic polyester resin, the polycarbonate resin or ABS resin (acrylonitrile-butadiene-styrene resin) is a recycled resin.

[25] A thermoplastic resin composition according to [21] or [24], wherein the aliphatic polyester resin is a polylactic acid resin.

[26] A molded product comprising the thermoplastic resin composition containing the rubber graft copolymer, wherein the thermoplastic resin composition according to any one of [1] to [7] is molded at 240° C. or more.

Effects of the Invention

According to the present invention, any of the following ones or a combination thereof can be provided: (1) the rubber graft copolymer useful for both the impact resistance and the appearance of the molded product from the thermoplastic resin at a high level, (2) the impact resistance modifier capable of providing the molded product obtained by molding the resin composition containing the resin having an ester bond such as the polycarbonate resin with the heat stability, and providing the wet heat aging resistance for a long period of time, and the thermoplastic resin composition containing the same, (3) the impact resistance modifier capable of improving the compatibility and the dispersibility of the alloy resins, besides the impact resistance and the appearance having the decreased pearl gloss of the molded product by the addition to the alloy resins, and the thermoplastic resin composition containing the same.

MODE FOR CARRYING OUT THE INVENTION

1. Thermoplastic Resin Composition

A thermoplastic resin composition of the present invention comprises a rubber graft copolymer comprising a core layer containing a rubber polymer and a shell layer grafted on the core layer, and a thermoplastic resin comprising a polycarbonate resin and an aliphatic polyester resin in the mass ratio of the rubber graft copolymer/the thermoplastic resin of 3/100 or more, wherein the shell layer is obtained by polymerizing or copolymerizing a (meth)acrylate monomer having an epoxy group, and the amount of the (meth) acrylate monomer having an epoxy group is 3 parts by mass or more and less than 29 parts by mass based on 100 parts by mass of the rubber graft copolymer. In the case where the (meta)acrylate monomer having an epoxy group is graft-polymerized as the shell layer in the above amount, the impact resistance and the appearance having the degreased pearl gross of the molded product, or the fluidity of the thermoplastic resin composition and the compatibility of the thermoplastic resin can be improved.

(A) Rubber Graft Copolymer

The rubber graft copolymer is obtained by graft-bonding the shell layer on the core layer containing the rubber polymer as set forth below, and it is suitable that the rubber graft copolymer has a core-shell structure.

(A-1) Rubber Polymer (Core Layer)

The rubber polymer used in the rubber graft copolymer of the present invention includes a diene polymer such as a polybutadiene, a poly (butadiene-styrene), a poly(acrylonitrile-butadiene), a butadiene-acrylic acid ester copolymer; an acrylate rubber polymer such as a polybutylacrylate, a butylacrylate-2-ethylhexyl acrylate copolymer; a polyorganosiloxane rubber polymer such as a silicone, a silicone-acrylate, and the like.

It is preferable that glass transition temperature (Tg) of the rubber polymer is −50° C. or less. From the view of highly improved effect of the impact strength and the raw material cost, the rubber polymer is preferably a diene polymer, and especially preferably a polybutadiene.

The kind or the amount of the vinyl monomer copolymerized with a diene monomer is not limited particularly. Preferably, the rubber polymer is a polymer (copolymer) of 50 to 100% by mass of 1,3-butadiene and 0 to 50% by mass of a vinyl monomer, and especially preferably a 1,3-butadiene homopolymer.

The vinyl monomer can include an aromatic vinyl monomer such as styrene, α-methyl styrene; (meth) acrylic acid and (meth) acrylic acid alkyl ester such as acrylic acid, methacrylic acid, ethylacrylate, butylacrylate, 2-ethylhexyl acrylate, methylmethacrylate, ethylmethacrylate, butylmethacrylate, 2-hydroxyethyl methacrylate, glycidyl methacrylate; an unsaturated nitrile monomer such as acrylonitrile, methacrylonitrile; and the like.

In the polymerization of the diene rubber, a polyfunctional monomer such as divinyl benzene, allyl methacrylate, ethyleneglycol dimethacrylate, 1,3-butylene dimethacrylate can be appropriately used.

In addition, methyl methacrylate; methyl methacrylate and other vinyl monomer; vinyl cyanide monomer and aromatic vinyl monomer; or vinyl cyanide monomer, aromatic vinyl monomer and other vinyl monomer may be graft-polymerized on the rubber polymer to form the core layer. From the view of the improvement of the impact resistance, it is preferable that these monomers are not contained in the rubber polymer.

(A-2) Graft Part (Shell Layer)

The shell layer is obtained by polymerizing or copolymerizing a monomer containing the (meth)acrylate having an epoxy group in a given amount. The (meth)acrylate contains methacrylate and acrylate.

(Meth)acrylate having an epoxy group includes glycidyl methacrylate, 1-methyl-1,2-epoxy-ethylmethacrylate, 4-hydroxybutyl methacrylate glycidyl ether, glycidyl acrylate, 1-methyl-1,2-epoxy-ethylacrylate, 4-hydroxybutylacrylate glycidyl ether and the like.

Among these, (meth)acrylate having an epoxy group is especially preferably glycidyl methacrylate, from the view of the improvement of the appearance and the impact resistance of the molded product, or the fluidity of the thermoplastic resin composition.

The amount of the (meth)acrylate monomer having an epoxy group is 3 parts by mass or more and less than 29 parts by mass, preferably 6 parts by mass or more and 28 parts by mass or less, more preferably 9 parts by mass or more and 25 parts by mass or less, based on 100 parts by mass of the rubber graft copolymer. In the amount of less than 3 parts by mass, the pearl gloss of the surface of the molded product cannot be sufficiently decreased, the impact resistance cannot be sufficiently exhibited, or the fluidity of the thermoplastic resin composition cannot be improved in some cases. In the amount of 29 parts by mass or more, the aggregation between the rubber graft copolymers is caused in the latex, and the impact resistance cannot be sufficiently exhibited in some cases.

The amount of the (meth)acrylate monomer having an epoxy group is preferably 10 parts by mass or more and 100 parts by mass or less, more preferably 20 parts by mass or more and 100 parts by mass or less, even preferably 30 parts by mass or more and 80 parts by mass or less, based on 100 parts by mass of the shell layer, from the view of the impact resistance or the decrease of the pearl gloss. When the amount of the (meth)acrylate monomer having an epoxy group is less than 10 parts by mass, the pearl gloss of the surface of the molded product cannot be hardly decreased, and the surface may have the pearl gloss. The amount of the (meth)acrylate monomer having an epoxy group may be 100 parts by mass, and it is necessary that the amount of the (meth)acrylate monomer having an epoxy group relative to the core layer is smaller in the case of the inclusion of other monomer constituting the shell layer from the view of the impact resistance.

The monomer forming the shell layer may contain vinyl monomer other than the (meth)acrylate having an epoxy group.

The vinyl monomer includes an aromatic vinyl compound, a vinyl cyanide compound, an unsaturated carboxylic acid and an unsaturated carboxylic ester and the like.

Among the aromatic vinyl compound, styrene, α-methylstyrene, o-methylstyrene, m-methylstyrene, p-methylstyrene, t-butylstyrene, α-methylvinyltoluene, dimethyl styrene, chlorostyrene, dichlorostyrene, bromostyrene, dibromostyrene and the like are preferable. Among the vinyl cyanide compound, acrylonitrile, methacrylonitrile and the like are preferable. Among the unsaturated carboxylic acid and the unsaturated carboxylic acid ester, acrylic acid, methacrylic acid, acrylic acid and methacrylic acid ester having carbon atom 1 to 12 of an alkyl ester and the like are preferable. Further, a vinyl monomer such as (meth)acrylate having an alkyl group having carbon atom 1 to 22, and a hydroxy group such as 2-hydroxy ethyl (meth)acrylate, 4-hydroxybutyl (meth)acrylate; (meth)acrylate having an alkyl group having carbon atom 1 to 22 and an alkoxy group such as methoxymethyl(meth)acrylate, methoxyethyl(meth)acrylate, ethoxymethyl(meth)acrylate, ethoxyethyl(meth)acrylate may be contained.

In addition, in the selection of these monomers, the kind of the thermoplastic resin to be modified by the formulation of the obtained rubber graft copolymer may be considered, and two or more monomers may be combined in an optional mixing ratio from the view of the compatibility to the thermoplastic resin, the reflectance of the thermoplastic resin composition after formulation and the like.

Preferable vinyl monomer is one or more kinds selected from a (meth)acrylate having no epoxy group (hereinafter referred to as monomer A) and a styrene monomer (hereinafter referred to as monomer B).

(Meth) acrylate having no epoxy group includes alkyl (meth)acrylate such as alkylester acrylates having an alkyl group having carbon atom 1 to 22 such as acrylate, methylacrylate, ethylacrylate, propylacrylate, butylacrylate, 2-ethylhexylacrylate, octylacrylate, dodecylacrylate, stearylacrylate, behenylacrylate; alkylester methacrylate having an alkyl group of carbon atom 1 to 22 such as methacrylate, methylmethacrylate, ethylmethacrylate, propylmethacrylate, butylmethacrylate, 2-ethylhexylmethacrylate, octylmethacrylate, dodecyl methacrylate, stearylmethacrylate, behenylmethacrylate.

Among these, it is preferable that methylmethacrylate is used from the view of the decreased pearl gloss of the surface of the molded product. These monomers may be used alone or in combination of two or more.

As the styrene monomer, those mentioned in the aromatic vinyl compound may be used.

It is preferable that the content of the monomer A or the monomer B relative to 100 parts by mass of glycidyl (meth)acrylate is as follows.

The content of the monomer A is preferably 0 parts by mass or more and 700 parts by mass or less, more preferably 0 parts by mass or more and 400 parts by mass or less, and even preferably 0.1 parts by mass or more and 150 parts by mass or less based on 100 parts by mass of glycidyl (meth)acrylate.

The content of the monomer B is preferably 0 parts by mass or more and 250 parts by mass or less, more preferably 0 parts by mass or more and 150 parts by mass or less, even preferably 0 parts by mass or more and 100 parts by mass or less, and even more preferably 0.1 parts by mass or more and 50 parts by mass or less, based on 100 parts by mass of glycidyl (meth)acrylate.

It is preferable that the rubber graft copolymer of the present invention has one kind or two or more kinds of reactive groups selected from an epoxy group, a hydroxy group, a carboxy group, an alkoxy group, an isocyanate group, an anhydride group, and an acid chloride group in a graft part (the shell layer).

By this, it is possible that the impact resistance is further improved compared with the case of using the rubber graft copolymer without containing the reactive groups. Further, the rubber graft copolymer having the reactive group is added to an alloy resin such as the polycarbonate resin and the polyester resin, and the rubber graft copolymer functions as the compatible agent, so that it is possible to improve the dispersibility of the alloy resins.

The improvement of the compatibility and the dispersibility is remarkable in the alloy resin compositions of the polycarbonate resin/polylactic acid resin. In addition, when the rubber graft copolymer having the reactive groups is added to the recycled resin such as the polycarbonate resin and the polyester resin, the resin having low molecular weight can be restored and also the physical properties thereof can be recovered.

The amount of the shell layer is preferably 20 parts by mass or more and 55 parts by mass or less, more preferably 25 parts by mass or more and 50 parts by mass or less, and even preferably 30 parts by mass or more and 45 parts by mass or less on based 100 parts by mass of the core layer, from the view of the compatibility between the thermoplastic resin and the shell layer, the impact resistance, and the decrease of the pearl gloss.

When the amount of the shell layer is less than 20 parts by mass, the compatibility between the shell layer and the thermoplastic resin is hardly improved, and the pearl gloss of the surface of the molded product cannot be decreased in some cases. In the case where the amount of the shell layer is more than 55 parts by mass, the amount of the core layer is small in the rubber graft copolymer, and the impact resistance can be sufficiently exhibited in some cases.

The methods for preparing the rubber graft copolymer may be adapted by any of bulk polymerization, solution polymerization, suspension polymerization, and emulsion polymerization. The preferable method is emulsion polymerization, that is, emulsion graft polymerization. Concretely, the latex may be added to a reactor equipped with a stirrer, a vinyl monomer, a polymerization initiator, water may be added thereto, and, if necessary, a chain transfer agent and an oxide reductive agent may be fed to heat and stir the mixture.

The kinds of the polymerization initiator, the chain transfer agent, and the oxide reductive agent used are not limited particularly, and conventionally known ones can be used, respectively. Also, the method for adding each raw material to the reactor is not limited particularly, raw materials may be added in batch before the initiation of the polymerization or dividedly added. In addition, the graft polymerization may be carried out at one step or two or more steps, and the composition of monomers at each step may be identical or different. Further, monomers may be added in batch or continuously or in the combination of the batch addition and the continuous addition.

In the case of the emulsion polymerization, a conventionally known polymerization initiator, or thermal decomposition type polymerization initiator such as 2,2'-azobisisobutyronitrile, hydrogen peroxide, potassium persulphate, ammonium persulphate can be used. In addition, a redox type polymerization initiator combining peroxides such as organic peroxides such as t-butyl peroxyisopropyl carbonate, para menthane hydroperoxide, cumene hydroperoxide, dicumyl peroxide, t-butyl hydroperoxide, di-t-butyl peroxide, t-hexyl peroxide, or inorganic peroxides such as hydrogen peroxide, potassium persulphate, ammonium persulphate, and if necessary, a reductive agent such as sodium formaldehyde sulfoxylate, glucose, and if necessary, a transition metal salt such as iron sulfate (II), and if necessary, a chelating agent such as ethylenediaminetetraacetic acid disodium, and if necessary, a phosphorus based flame retardant such as sodium pyrophosphate can be used.

In the case of the redox type polymerization initiator, since polymerization can be carried out at lower temperature in which the peroxide does not substantially decompose by heat, the polymerization temperature can be set in the wide range, so that the redox type polymerization initiator is preferable. Especially, it is preferable that peroxides containing an aromatic ring such as cumene hydroperoxide, dicumyl peroxide are used as the redox type polymerization initiator. The used amount of the polymerization initiator or the used amount of the reductive agent, the transition metal salt, the chelating agent and the like in the case of use of the redox type polymerization initiator can be used in a known range.

Preferable method for preparing the rubber graft copolymer includes a method comprising the steps of: (a) preparing a latex containing a rubber graft copolymer by polymerizing at conditions of pH of 4.6 to 9.4 under the presence of an alkaline metal salt of a phosphate compound, (b) adding to the latex a solution containing an alkaline earth metal chloride to coagulate the copolymer, and (c) washing and drying the obtained coagulated substances. When the rubber graft copolymer is prepared through the steps (a) to (c), the content of phosphorus and the alkaline earth metal of the rubber graft copolymer can be adjusted in a given range, so that the heat stability, the wet heat aging resistance, the color tone and the like from the thermoplastic resin composition can be kept.

The step (a) for preparing the latex is composed of core layer forming step (a1) of polymerizing a given monomer in water under the presence of the polymerizable emulsifier to form the rubber polymer layer (the core layer), and graft layer forming step (a2) of graft-polymerizing a given monomer on the rubber polymer (core) in water under the presence of the polymerizable emulsifier.

The alkaline metal salt of the phosphate compound is used as the polymerizable emulsifier in any of the core layer forming step (a1) and the graft layer forming step (a2). It is preferable that the alkaline metal salt of the phosphate compound is used in both the core layer forming step (a1) and the shell layer forming step (a2). The alkaline metal salt of the phosphate compound is not limited particularly, and a conventionally known ones can be used as long as the compound contains a salt of the phosphate compound and the alkaline metal. The example can include an alkyl phosphate salt and an alkyl aryl phosphate salt.

The alkaline metal salt of the phosphate compound (for example, alkyl phosphate salt, alkyl aryl phosphate salt) is preferably polyoxyalkylene alkyl phenyl ether phosphate salt, polyoxyalkylene alkyl ether phosphate salt, more preferably polyoxyethylene alkyl phenyl ether phosphate salt, polyoxyethylene alkyl ether phosphate salt, and even preferably polyoxyethylene alkyl ether phosphate salt from the view of keeping the polymerization stability.

The alkyl group of the polyoxyethylene alkyl ether phosphate salt is, for example, carbon atom number 1 to 20, preferably carbon atom number 5 to 18, more preferably carbon atom number 7 to 16, and even preferably carbon atom number 10 to 16.

The unit number of oxyethylene unit of polyoxyethylene alkyl ether phosphate salt is, for example, 2 to 14, preferably 2 to 10, more preferably 2 to 8, and even preferably 2 to 6.

These emulsifiers do not easily deteriorate the polycarbonate resin and the polyester resin, and the emulsifiers are easily removed from the rubber graft copolymer by wash with water and a solvent. In addition, in the case where strong acids of these emulsifiers remain as a salt with alkaline earth metal, it is known that the polycarbonate resin and the polyester resin are deteriorated by the salt.

The content of the alkaline earth metal of the rubber graft copolymer is preferably 3000 ppm or less, more preferably 2000 ppm or less, and even preferably 1000 ppm or less on a mass basis, in order not to deteriorate the polycarbonate resin and the polyester resin and keep the good heat stability. The lower limit of the content of the alkaline earth metal of the rubber graft copolymer is not limited particularly as long as the alkaline earth metal salt of the phosphate compound is washed with water and the like after use of a coagulating agent containing the alkaline earth metal salt. The lower limit thereof is, for example, 400 ppm or more, preferably 500 ppm or more, more preferably 600 ppm or more, even preferably 700 ppm or more, and even more preferably 800 ppm or more on a mass basis.

More concretely, the phosphate compound used in the manufacture of the rubber graft copolymer does not remain as the alkaline earth metal salt, or in the case of remaining as the alkaline earth metal salt, the content thereof may be in the above range.

In addition, in the case of no remaining as the alkaline earth metal salt or in the case of remaining as the alkaline earth metal salt in the above range, the heat stability, the color tone and the wet heat aging resistance from the rubber graft copolymer is improved.

The content of phosphorus of the rubber graft copolymer is, for example, 10 ppm or more, preferably 30 ppm or more, and more preferably 50 ppm or more on a mass basis, from the view of the improvement of the heat stability, the wet heat aging resistance, and the color tone from the rubber graft copolymer obtained by emulsion-polymerizing with the polymerizable emulsifier including the alkaline metal salt of the phosphate compound. The upper limit of the content of phosphorus of the rubber graft copolymer is not limited particularly. The upper limit thereof is, for example, 1500 ppm or less on a mass basis, and preferably 1000 ppm or less on a mass basis.

The rubber graft copolymer of the present invention is prepared under conditions that pH of a solution for polymerization is 4.6 to 9.4. Preferably, the rubber graft copolymer is prepared under conditions that pH of the solution for polymerization is 4.6 to 9.4 at the time of the preparation of the rubber polymer (core layer forming step (a1)) and/or the graft layer forming step (a2). In addition, the rubber graft copolymer of the present invention is preferably prepared under conditions that pH of the solution for polymerization is 5.0 to 9.0, more preferably prepared under conditions that pH of the solution for polymerization is 5.0 to 9.0 at the time of the preparation of the rubber polymer and/or the graft layer. In addition, the rubber graft copolymer of the present invention is more preferably prepared under conditions that pH of the solution for polymerization is 5.5 to 8.5, even preferably prepared under conditions that pH of the solution for polymerization is 5.5 to 8.5 at the time of the preparation of the rubber polymer and/or the graft layer.

When pH is less than 4.6 or more than 9.4, the decomposition of the polycarbonate resin and the polyester resin is promoted, and the good heat stability is not obtained, so that pH of less than 4.6 and more than 9.4 is not preferable.

The concentration of the polymerizable emulsifier is not limited particularly as long as the rubber graft copolymer can be stably emulsion-polymerized. The concentration thereof is, for example, 0.1 parts by mass or more and 5 parts by mass or less, preferably 0.3 parts by mass or more and 3 parts by mass or less, and more preferably 0.5 parts by mass or more and 2 parts by mass or less, based on 100 parts by mass of the total monomer(s) constituting the rubber polymer.

The concentration of the monomer used in the polymerization of the rubber polymer may be 100% by mass of butadiene of 100% by mass of the components constituting the rubber polymer. The concentration of the monomer used in the polymerization of the graft polymer may be, for example, (1) 60 to 80% by mass of methyl methacrylate and 20 to 40% by mass of styrene, or (2) 70 to 99% by mass of methyl methacrylate and 1 to 30% by mass of butylacrylate, or (3) 30 to 40% by mass of glycidyl methacrylate, 45 to 55% by mass of methylmethacrylate, and 5 to 25% by mass of styrene, of 100% by mass of monomers constituting the graft polymer.

A solvent used in the polymerization may be those proceeding the stable emulsion polymerization. For example, the solvent such as water can be used suitably.

The temperature for emulsion polymerization is not limited particularly as long as the polymerizable emulsifier is dissolved in the solvent uniformly. The temperature is, for example, 40 to 75° C., preferably 45 to 70° C., and more preferably 49 to 65° C.

The rubber graft copolymer of the present invention may be obtained by contacting a solution containing an alkaline earth metal chloride to a latex containing the rubber graft copolymer obtained by the emulsion polymerization to coagulate the copolymer.

When the rubber graft copolymer used in the present invention is obtained by the emulsion polymerization, after the latex containing the rubber graft copolymer is mixed with a solution containing a metal salt having two or more valences such as calcium chloride, magnesium chloride, magnesium sulfate, aluminum chloride, calcium acetate to coagulate the copolymer, and the heat treatment, dehydration, washing, and drying are carried out according to a known method, so that the rubber graft copolymer can be separated from a aqueous medium (hereinafter referred to as coagulation method).

The metal salt having two or more valences is preferably calcium chloride and magnesium chloride in the view of economic and inexpensive availability and easy handleability. In the case where no inclusion of halogen in a minute amount is desirable from the consideration to the environment, magnesium sulfate can be used suitably as the metal salt having two or more valences.

It is preferable that the rubber graft copolymer is washed by water and/or a solvent.

The washing is carried out as follows: For example, in the step after the coagulation with the metal salt, a slurry is diluted before dehydration such that the solid content of the rubber graft copolymer is preferably 1:20 or more, more preferably 1:30 or more, and even preferably 1:50 or more, or in the step after dehydration, the solvent having the volume of preferably more than three times larger, more preferably more than five times larger, and even preferably more than ten times larger than the solid content of the rubber graft copolymer is sprayed to wash the copolymer, and the solvent is preferably water in the view from the environment load, or in step after dehydration, the dehydrated copolymer is dispersed again in the above-mentioned solvent having the volume of preferably more than five times larger than the solid content of the copolymer to dehydrate the copolymer again, and the solvent is preferably water. By the above washing, the metal salt remaining in the rubber graft copolymer can be decreased, problems such as the discoloration and the decomposition of the matrix resin on molding can be decreased, and the good heat stability can be provided, so that these treatments are preferable.

Also, water-soluble organic solvents such as alcohol such as methanol, ethanol, propanol, and acetone can be added to the latex to precipitate the rubber graft copolymer, thus obtained ones can be separated from the solvent by centrifugation or filtration and the like, and the rubber graft copolymer can be isolated after drying.

Another method can include a method comprising the steps of adding an organic solvent having weak water solubility such as methyl ethyl ketone to the latex containing the rubber graft copolymer used in the present invention, extracting the rubber graft copolymer of the latex to the organic solvent phase, separating the organic solvent phase, mixing with water and the like to precipitate the rubber graft copolymer.

In addition, the latex can be directly powdered by spray drying method. In this case, the obtained powder can be washed with the solvent in the same way as the above-mentioned coagulation method to obtain the similar effects. Calcium chloride, magnesium chloride, magnesium sulfate, aluminum chloride and the like, preferably a solution such as an aqueous solution containing any of these is added to the obtained powder, and, if necessary, re-drying is carried out to obtain the similar effects.

In another embodiment, the rubber graft copolymer of the present invention satisfies all of the following (1) to (3):

(1) the rubber graft copolymer polymerized under the presence of an alkaline metal salt of a phosphate compound (2) the rubber graft copolymer in which the phosphate compound does not remain as an alkaline earth metal salt in the rubber graft copolymer or in the case of remaining as the alkaline earth metal salt, the remaining amount of the alkaline earth metal salt of the phosphate compound is 3000 ppm or less as an alkaline earth metal on a mass basis (3) the rubber graft copolymer obtained by polymerizing at conditions of pH of 4.6 to 9.4.

In another embodiment, in the rubber graft copolymer of the present invention, the shell layer obtained by polymerizing or copolymerizing the (meth)acrylate monomer having an epoxy group is grafted on the core layer containing the rubber polymer, and the content of phosphorus is 10 ppm or more on a mass basis, and the content of an alkaline earth metal is 3000 ppm or more on a mass basis.

The volume average particle diameter of the rubber graft copolymer is preferably 10 nm or more and 1 μm or less, more preferably 20 nm or more and 800 nm or less, and even preferably 50 nm or more and 600 nm or less from the view of good dispersibility in the thermoplastic resin.

(B) Thermoplastic Resin

The rubber graft copolymer of the present invention can be formulated to various thermoplastic resins as the impact resistance modifier. Such thermoplastic resin includes hard, semihard, or soft chloride-containing resins such as polyvinyl chloride resin (PVC), chlorinated polyethylene resin, chlorinated polyvinyl chloride resin, polyvinylidene chloride resin; olefin resins such as polypropylene (PP), polyethylene (PE); styrene resins (St resins) such as polystyrene (PS), high impact polystyrene (HIPS), (meth)acrylate-styrene copolymer (MS), styrene-acrylonitrile copolymer (AS), styrene-maleic anhydride copolymer (SMA), acrylonitrile-butadiene-styrene resin (ABS), acrylate-styrene-acrylonitrile resin (ASA), acrylonitrile-ethylenepropylene rubber-styrene resin (AES); acrylate resins (Ac resins) such as polymethylmethacrylate (PMMA); polycarbonate resins (PC resins); polyamide resins (PA resins); polyester resins (PEs resin) such as polyethylene terephthalate (PET), polybutylene terephthalate (PBT); polylactic acid resin, thermoplastic polyvinylalcohol resin, polybutylene succinate, environment adaptive resins derived from natural raw material or petroleum raw material having biodegradability (generally those referred to as biodegradability resins); engineering plastics such as (modified)polyphenylene ether resins (PPE resins), polyoxymethylene resins (POM resins), polysulfone resins (PSO resins), polyarylate resins (PAr resins), polyphenylene resins (PPS resins), thermoplastic polyurethane resins (PU resins); thermoplastic elastomers (TPE) such as styrene elastomer, olefin elastomer, vinyl chloride elastomer, urethane elastomer, polyester elastomer, polyamide elastomer, fluorinated elastomer, 1,2-polybutadiene, trans 1,4-polyisoprene; polymer alloys such as PC resin/St resin alloy such as PC/ABS, PVC resin/St resin alloy such as PVC/ABS, PA resin/St resin alloy such as PA/ABS, PA resin/polyolefin resin alloy such as PA resin/TPE resin alloy, PA/PP, PC resin/PEs resin alloy such as PBT resin/TPE, PC/PBT, olefin resin alloys such as polyolefin resin/TPE, PP/PE, PPE resin alloy such as PPE/HIPS, PPE/PBT, PPE/PA, PVC resin/Ac resin alloy such as PVC/PMMA. These resins may be used separately or in combination of two or more. Among these thermoplastic resins, it is preferable that at least one resin selected from the polycarbonate resin and the polyester resin is used, since effects of the heat stability from the rubber graft copolymer of the present invention are exhibited.

In addition, these thermoplastic resins may be virgin materials or recycled materials. Especially, it is suitable that recycled resins such as the polycarbonate resin and the polyester resin as well as the rubber graft copolymer having an reactive group of the present invention are combined, since the recycled resin having low molecular weight can be restored (polymerized), and the physical properties of the recycled resin can be restored.

Further, it is suitable that the rubber graft copolymer having a reactive group of the present invention is added to alloy resins such as the polycarbonate resin and the polyester resin, since the rubber graft copolymer functions as a compatible agent, and the dispersibility of alloy resins can be improved.

It is preferable that the rubber graft copolymer of the present invention is used in one kind or two or more kinds of resins selected from an aliphatic polyester resin, an aromatic polyester resin, and a polycarbonate resin.

In addition, the rubber graft copolymer may be used in ABS resin (acrylonitrile-butadine-styrene resin), and the polycarbonate resin. The rubber graft copolymer may be used in a resin of which at least one of the aliphatic polyester resin, the aromatic polyester resin, the polycarbonate resin, or ABS resin is recycled.

The aliphatic polyester resin includes polylactic acid, polyglycolic acid, poly 3-hydroxybutyric acid, poly 4-hydroxybutyric acid, poly 4-hydroxy valeric acid, poly 3-hydroxyhexanoic acid, polycaprolactone, polyethylene adipate, polyethylene succinate, polybutylene adipate, polybutylene succinate and the like.

The polylactic acid resin usable as the alloy resin in the present invention is a polymer containing as a main component L-lactic acid and/or D-lactic acid, and other component for copolymerization other than polylactic acid may be contained.

An unit of other monomer includes glycol compounds such as ethylene glycol, propylene glycol, butane diol, heptane diol, hexane diol, octane diol, nonane diol, decane diol, 1,4-cyclohexane dimethanol, neopentyl glycol, glycerine, pentaerythritol, bisphenol A, polyethylene glycol, polypropylene glycol and polytetramethylene glycol, dicarboxylic acid such as oxalic acid, adipic acid, sebacic acid, azelaic acid, dodecanedioic acid, malonic acid, glutaric acid, cyclohexane dicarboxylic acid, terephtalic acid, isophtalic acid, phthalic acid, naphthalene dicarboxylic acid, bis(p-carboxyphenyl)methane, anthracene dicarboxylic acid, 4,4'-diphenylether dicarboxylic acid, sodium 5-sulfoisophthalic acid, 5-tetrabutyl phosphonium isophthalic acid; hydroxycarboxylic acid such as glycol acid, hydroxypropionic acid, hydroxybutyric acid, hydroxy valeric acid, hydroxycapronic acid, hydroxybenzoic acid; lactones such as caprolactone, valerolactone, propiolactone, undecalactone, 1,5-oxepane-2-one. Other component for copolymerization is preferably 0 to 30% by mole, and more preferably 0 to 10% by mole based on the total monomers.

Modified polylactic acid resin may be used as polylactic acid resin. For example, it is preferable that maleic anhydride modified polylactic acid resin, epoxy modified polylactic acid resin, amine modified polylactic acid resin and the like is used, since the heat resistance and mechanical properties are apt to improve. A method for preparing polylactic acid resin can be a known polymerization method, and can include a method for directly polymerizing from lactic acid, and a method for ring-opening polymerizing via lactide and the like.

The aromatic polyester resin is not limited particularly as long as the resin is a polyester resin having an aromatic ring. As the aromatic polyester resin, polyethylene terephthalate, polybutylene terephthalate, polytrimethylene terephthalate, polyethylene naphthalate, polybutylene naphthalate and the like can be selected appropriately.

Polycarbonate resin may be ones obtained by reacting a phenol compound having two or more valances with a carbonate diester compound such as phosgene or diphenyl carbonate.

The phenol compound having two or more valences is not limited particularly, and includes dihydroxydiarylalkanes such as 2,2-bis(4-hydroxyphenyl) propane (commonly known as bisphenol A), bis(4-hydroxyphenyl) methane, bis(4-hydroxyphenyl)phenylmethane, bis(4-hydroxyphenyl) naphthylmethane, bis(4-hydroxyphenyl)-(4-isopropylphenyl) methane, bis(3,5-dichloro-4-hydroxyphenyl)methane, bis(3,5-dimethyl-4-hydroxyphenyl) methane, 1,1-bis(4-hydroxyphenyl)ethane, 1-naphthyl-1,1-bis(4-hydroxyphenyl) ethane, 1-phenyl-1,1-bis(4-hydroxyphenyl)ethane, 1,2-bis(4-hydroxyphenyl)ethane, 2-methyl-1,1-bis(4-hydroxyphenyl) propane, 2,2-bis(3,5-dimethyl-4-hydroxyphenyl)propane, 1-ethyl-1,1-bis(4-hydroxyphenyl) propane, 2,2-bis(3,5-dichloro-4-hydroxyphenyl)propane, 2,2-bis(3,5-dibromo-4-hydroxyphenyl) propane, 2,2-bis(3-chloro-4-hydroxyphenyl)propane, 2,2-bis(3-methyl-4-hydroxyphenyl) propane, 2,2-bis(3-fluoro-4-hydroxyphenyl) propane, 1,1-bis(4-hydroxyphenyl)butane, 2,2-bis(4-hydroxyphenyl)butane, 1,4-bis(hydroxyphenyl)butane, 2,2-bis(4-hydroxyphenyl)pentane, 4-methyl-2,2-bis(4-hydroxyphenyl)pentane, 2,2-bis(4-hydroxyphenyl)hexane, 4,4-bis(4-hydroxyphenyl)heptane, 2,2-bis(4-hydroxyphenyl)nonane, 1,10-bis(4-hydroxyphenyl)decane, 1,1-bis(4-hydroxyphenyl)-3,3,5-trimethylcyclohexane, 2,2-bis(4-hydroxyphenyl)-1,1,1,3,3,3-hexafluoropropane; dihydroxydiarylcycloalkanes such as 1,1-bis(4-hydroxyphenyl)cyclohexane, 1,1-bis(3,5-dichloro-4-hydroxyphenyl)cyclohexane, 1,1-bis(4-hydroxyphenyl)cyclodecane; dihydroxydiarylsulfones such as bis(4-hydroxyphenyl)sulfone, bis(3,5-dimethyl-4-hydroxyphenyl)sulfone, bis(3-chloro-4-hydroxyphenyl)sulfone; dihydroxyarylethers such as bis(4-hydroxyphenyl)ether, bis(3,5-dimethyl-4-hydroxyphenyl) ether; dihydroxydiarylketones such as 4,4'-dihydroxybenzophenone, 3,3',5,5'-tetramethyl-4,4'-dihydroxybenzophenone; dihydroxydiarylsulfides such as bis(4-hydroxyphenyl)sulfide, bis(3-methyl-4-hydroxyphenyl)sulfide, bis(3,5-dimethyl-4-hydroxyphenyl)sulfide; dihydroxydiarylsulfoxides such as bis(4-hydroxyphenyl) sulfoxide; dihydroxydiphenyls such as 4,4'-dihydroxydiphenyl; dihydroxyaryl fluorenes such as 9,9-bis(4-hydroxyphenyl)fluorene. In addition, beside the phenol compound of the two valences, dihydroxybenzene such as hydroquinone, resorcinol, methylhydroquinone; dihydroxynaphthalene such as 1,5-dihydroxynaphthalene, 2,6-dihydroxynaphthalene and the like can be used as the phenol compound of the two valences.

A phenol compound having three or more valences can be used as long as the polycarbonate resin can maintain the thermoplastic properties. Examples of the phenol compound having three or more valences include 2,4,4'-trihydroxybenzophenone, 2,2',4,4'-tetrahydroxybenzophenone, 2,4,4'-trihydroxyphenylether, 2,2',4,4'-tetrahydroxyphenylether, 2,4,4'-trihydroxydiphenyl-2-propane, 2,2'-bis(2,4-dihydroxy) propane, 2,2',4,4'-tetrahydroxydiphenylmethane, 2,4,4'-trihydroxydiphenylmethane, 1-[α-methyl-α-(4'-dihydroxyphenyl)ethyl]-3-[α',α'-bis(4"-hydroxyphenyl) ethyl]benzene, 1-[α-methyl-α-(4'-dihydroxyphenyl)ethyl]-4-[α',α'-bis(4"-hydroxyphenyl)ethyl]benzene, α,α',α"-tris (4-hydroxyphenyl)-1,3,5-triisopropylbenzene, 2,6-bis(2-hydroxy-5'-methylbenzyl)-4-methylphenol, 4,6-dimethyl-2, 4,6-tris(4'-hydroxyphenyl)-2-heptene, 4,6-dimethyl-2,4,6-tris-(4'-hydroxyphenyl)-2-heptane, 1,3,5-tris(4'-hydroxyphenyl)benzene, 1,1,1,-tris(4-hydroxyphenyl) ethane, 2,2-bis[4,4-bis(4'-hydroxyphenyl)cyclohexyl] propane, 2,6-bis(2'-hydroxy-5'-isopropylbenzyl)-4-isopropylphenol, bis[2-hydroxy-3-(2'-hydroxy-5'-methylbenzyl)-5-methylphenyl]methane, bis[2-hydroxy-3-(2'-hydroxy-5'-isopropylbenzyl)-5-methylphenyl]methane, tetrakis(4-hydroxyphenyl)methane, tris(4-hydroxyphenyl) phenylmethane, 2',4',7-trihydroxyflavane, 2,4,4-trimethyl-2',4',7-trihydroxyflavane, 1,3-bis(2'4'-dihydroxyphenyliso propyl)benzene, tris(4'-hydroxyphenyl)-amyl-s-triazine and the like.

These phenol compounds having two or more valences may be used separately, or in combination of two or more.

The polycarbonate resin can contain a component for a branched polycarbonate resin in addition to the phenol compound having three or more valences in accordance with necessary, as long as the effect of the present invention is not impaired.

The component (branching agent) other than the phenol compound having three or more valences used in the branched polycarbonate resin includes, for example, phloroglucin, mellitic acid, trimellitic acid, trimellitic acid chloride, trimellitic acid anhydride, gallic acid, n-propyl gallate, protocatechuic acid, pyromellitic acid, pyromellitic dianhydride, α-resorcylic acid, β-resorcylic acid, resorcinol aldehyde, trimethylchloride, isatinbis(o-cresol), trimethyltrichloride, 4-chloroformyl phthalic anhydride, benzophenone tetracarboxylic acid and the like.

As a component for copolymerization of the polycarbonate resin, for example, linear chain and aliphatic divalent carboxylic acid such as adipic acid, pimelic acid, suberic acid, azelaic acid, sebacic acid, decanedicarboxylic acid and the like may be used.

As a component for the polycarbonate resin, various and known chain-end terminators used as the chain-end terminators for polymerization can be used in accordance with necessary as long as the effect of the present invention is not impaired.

Specifically, the chain-end terminators include phenol, p-cresol, p-t-butylphenol, p-t-octylphenol, p-cumylphenol, bromophenol, tribromophenol, nonylphenol and the like, which is one valent phenol compound.

The carbonate diester compound used as a raw material of the polycarbonate resin includes diarylcarbonate such as diphenyl carbonate, dialkylcarbonate such as dimethyl carbonate, diethyl carbonate.

Preferable concrete examples of the polycarbonate resin includes a polycarbonate resin obtained by interfacial polycondensation method for reacting bisphenol A and phosgene, and a polycarbonate resin obtained by melt polymerization method for reacting bisphenol A and diphenyl carbonate.

The alloy resin usable in the present invention is, for example, the polycarbonate resin and the polylactic acid resin. The mass ratio of the polycarbonate resin and the polylactic acid (polycarbonate/polylactic acid) is preferably 50 to 95/5 to 50, more preferably 60 to 90/10 to 40, and even preferably 60 to 80/20 to 40.

The mass ratio of the rubber graft copolymer and the thermoplastic resin (rubber graft copolymer/thermoplastic resin) is 3/100 or more, preferably 4/100 or more, and more preferably 5/100 or more.

The upper limit of the mass ratio is, for example, 3/100 or less, preferably 25/100 or less, and more preferably 20/100 or less. In the case of the mass ratio of less than 3/100, the impact resistance, the appearance and the like can be exhibited sufficiently in some cases. In the case of the mass ratio of more than 30/100, the rubber graft copolymer can be dispersed sufficiently due to the increase of the viscosity of the thermoplastic resin composition in some cases.

When the rubber graft copolymer does not contain phosphorus, (meth)acrylate having an epoxy group of the shell layer is not essential, and the above mentioned monomer may be used suitably. In addition, arbitrary resins can be used as the thermoplastic resin, and the ratio of the rubber graft copolymer relative to the thermoplastic resin is not limited particularly.

In the thermoplastic resin composition obtained by formulating the rubber graft copolymer to other thermoplastic resin, it is preferable that the content of the rubber graft copolymer is 1 to 60% by mass and the content of the thermoplastic resin is 99 to 40% by mass.

The content of the rubber graft copolymer is more preferably 1 to 40% by mass, and even preferably 1 to 20% by mass. In the range, the impact resistance can be provided without affecting the decrease of the heat stability of the thermoplastic resin and the like.

A dye, a pigment, a stabilizer, a reinforcing agent, a filler, a flame retardant, a foaming agent, a lubricant, a plasticizer and the like can be formulated to the thermoplastic resin composition in accordance with the necessary.

The method for preparing the thermoplastic resin composition of the present invention is not limited particularly, and a henschel mixer, a tumbler mixer and the like can be used in the mixture of raw materials, kneading machines such as a single-screw or twin-screw extruder, a banbury mixer, a pressurizing kneader, a mixing roll can be used in the melt kneading.

The thus prepared thermoplastic resin composition can be utilized in various applications, for example, building applications, electric and electronic applications, vehicle applications and the like. The thermoplastic resin composition can be utilized, for example, electric and electronic applications such as a personal computer, a liquid crystal display, a projector, a PDA, a printer, a copy machine, a facsimile, a video camera, a digital camera, a cellular phone (smart phone), a portable audio device, a game machine, a DVD recorder, a microwave oven, a rice cooker; building applications such as a light transmitting plate for road, a lighting window, a carport, a lens for lighting, a cover for lighting, a siding for building, and a door; vehicle applications such as a handle, a shift lever, a vibration absorber for an automobile, and a window, a display, a light, a panel of driving seat for train.

When the thermoplastic resin composition containing the rubber graft copolymer of the present invention is molded at the high temperature, the improving effect of the heat stability and the wet heat aging resistance is remarkable compared to the thermoplastic resin composition containing the conventional rubber graft copolymer. The improving effects are remarkable at the molding temperature of 240° C. or higher, and more remarkable at the molding temperature of 260° C. or higher. In the molding at the molding temperature of 280° C. or higher, the improving effects are especially remarkable.

The summary of the present invention is as mentioned above. When the content of phosphorus of the rubber graft copolymer is 10 ppm or more on a mass basis, and/or the content of an alkaline earth metal is 3000 ppm or less on a mass basis, the shell layer may be formed from a monomer other than (meth)acrylate having an epoxy group.

This application claims the benefit of priority to Japanese Patent Application No. 2012-094701, filed on Apr. 18, 2012. The entire contents of the specifications of Japanese Patent Application No. 2012-094701, filed on Apr. 18, 2012 is incorporated herein by reference.

EXAMPLES

Next, the present invention will be described in detail with reference to Examples, but the present invention is not limited thereto, and the variation and the modification of the present invention without departing the gist described above and below are all included the technical scope of the present invention. In the following examples, "part(s)" and "%" mean "part(s) by mass" and "% by mass", respectively. The measurement and test employed in the present invention are carried out as follows.

[Analysis of Element Contained in Rubber Graft Copolymer]

The concentration of alkaline earth metal (calcium), phosphorus, sulfur and chlorine of the powdered rubber graft copolymer obtained was measured with X-ray fluorescence spectrometers (XEPOS SPECTRO manufactured by AMETEK, Inc).

[Measurement of pH Under Polymerization Condition]

pH was measured in a part collected from the latex during polymerization. The measurement of pH was carried out by pH meter (D-21, manufactured by HORIBA, Ltd).

[Polymerization Conversion]

A part of the obtained latex was collected and precisely weighed, dried in the hot air drying device at 120° C. for one hour, and the weight after drying was precisely weighed as the solid content. Next, the ratio of the masses from the precise weighs between before drying and after drying was determined as the ratio of the solid components of the latex. Finally, the polymerization conversion was calculated from the following formula 1 with the ratio of the solid components.

Polymerization conversion=(total mass of charged raw materials×ratio of solid components−total mass of raw materials other than monomers)/mass of charged monomers×100(%)  (formula 1)

[Volume Average Particle Diameter]

The volume average particle diameters of the rubber polymer and the rubber graft polymer were measured in the state of the latex. The volume average particle diameter (μm) was measured using a particle size analyzer (MICROTRAC (registered trademark) UPA 150, manufactured by Nikkiso Co., Ltd.) as a measuring apparutus.

[Impact Resistance]

⅛ inch notched Izod impact strength was measured according to ASTM D-256.

[Color Tone]

The color tone/YI of the plate having the thickness of 2 mm was measured with color-difference meter (SE-2000) manufactured by NIPPON DENSHOKU INDUSTRIES Co., LTD according to ASTM-E1925.

[Heat Stability]

The plate having the thickness of 2 mm was left to stand in the dry oven at 120° C. for a given times, and the color tone/YI was measured with color-difference meter (SE-2000) manufactured by NIPPON DENSHOKU INDUSTRIES Co., LTD according to ASTM-E1925.

[Wet Heat Aging Property]

A test piece for ⅛ inch nothched Izod was left to stand in the thermohygrostat under conditions of 90° C. and 95% RH for a given times, and Izod impact strength was measured in accordance with ASTM D-256.

[Appearance]

The conditions of the surface of the molded product were observed with eye. The case of uniform was best (⊚), the case where a small part showed patchy patterns like pearl gloss was good (○), the case where a part showed patchy patterns like pearl gloss was good (○−), and the case where the whole showed patchy patterns like pearl gloss was bad (x).

[Melt Flow Rate (MFR)]

MFR was measured according to ASTM D1238.

Synthetic Example 1

Synthesis of Rubber Graft Copolymer

Manufacture Example 1a

Manufacture of Rubber Polymer

To pressure resistant vessel equipped with agitator, 200 parts of pure water, 0.002 parts of disodium ethylenediaminetetraacetic acid, 0.0012 parts of iron(II) sulfate, 0.008 parts of disodium ethylenediaminetetraacetic acid, and 0.03 parts of polyoxyethylene alkyl ether sodium phosphate were charged, and subjected to deoxidization. Then 100 parts of butadiene, 0.05 parts of sodium formaldehydesulfoxylate and 0.2 parts of para menthane hydroperoxide were added thereto, 1.4 parts of polyoxyethylene alkyl ether sodium phosphate was dropped spending 6 hours, and the solution for reaction was maintained in pH of 6.5 to 7.5 at 50° C. for 124 hours, to obtain a diene rubber latex (1a) having 98% by mass of polymerization conversion and 180 nm of volume average particle diameter.

Manufacture Example 1b

Manufacture of Graft Copolymer from the Formation of Graft Layer

While the thus obtained rubber latex (1a) (about 71 parts of solid content) was maintained at 60° C., as monomers, 22 parts of methylmethacrylate and 7 parts of styrene were added thereto spending 1 hour.

Also, at the same time as the addition of the monomers, the addition of 0.07 parts of t-butylhydroperoxide and 0.1 parts of sodium formaldehydesulfoxylate was started, and the total amount was added spending 2 hours while the solution for reaction was maintained in pH of 6.5 to 7.5 at the temperature of about 60° C. Further, the solution for reaction was retained at about 60° C. for 1 hour to obtain a latex containing a rubber graft copolymer (1b) having 200 nm of the volume average particle particle.

2 parts of IRGANOX-1076 (n-octadecyl-3-(3',5',di-t-butyl-4'-hydroxyphenyl)propionate) which was a phenol antioxidant was added to the latex containing the rubber graft copolymer, and the mixture was subjected to coagulation with a solution containing calcium chloride, wash with water, dehydration, and drying, to obtain a powdered rubber graft copolymer (1c) in pH 6.5 to 7.5. In the obtained powdered rubber graft copolymer (1c), the remaining amounts of phosphorus, sulfur, calcium, and chlorine was 550 ppm, <5 ppm, 850 ppm, 350 ppm, respectively.

Synthetic Examples 2 and 3

Synthesis of Rubber Graft Copolymer

Synthetic examples 2 and 3 were carried out in the same way as Synthetic example 1 except that other emulsifier was used in place of polyoxyethylene alkyl ether sodium phosphate on the manufacture of the rubber polymer, to obtain powdered rubber graft copolymers (2c and 3c).

The rubber graft copolymer manufactured with sodium dodecylbenzenesulfonate (alkaline metal salt of strong acid) was referred to as the powdered rubber graft copolymer (2c), and the rubber graft copolymer manufactured with partially hydrogenated tallow fatty acid potassium (alkaline metal salt of fatty acid) was referred to as the powdered rubber graft copolymer (3c). The remaining amounts of phosphorus, sulfur, calcium, and chlorine of the obtained powdered rubber graft copolymers (2c) and (3c) were 2c: <5 ppm, 1100 ppm, 900 ppm, 350 ppm, 3c: <5 ppm, <5 ppm, 1020 ppm, 1230 ppm, respectively.

Synthetic Examples 4 and 5

Synthesis of Rubber Graft Copolymer

Synthetic examples 4 and 5 were carried out in the same way as Synthetic example 1 except that pH of the solution for reaction was changed on the manufacture of the rubber polymer and the graft copolymer, to obtain powdered rubber graft copolymers (4c and 5c). The rubber graft copolymer obtained by manufacturing the rubber polymer at conditions of pH of 3.5 to 4.5 and forming the graft layer was referred to as the powdered rubber graft copolymer (4c), and the rubber graft copolymer obtained by manufacturing the rubber polymer at conditions of pH of 9.5 to 10.5 and forming the graft layer was referred to as the powdered rubber graft copolymer (5c). The remaining amounts of phosphorus, sulfur, calcium, and chlorine of the obtained powdered rubber graft copolymers (4c) and (5c) were 4c: 540 ppm, <5 ppm, 900 ppm, 410 ppm, 5c: 550 ppm, <5 ppm, 890 ppm, 400 ppm, respectively.

Synthetic Examples 6 and 7

Synthesis of Rubber Graft Copolymer

Synthetic examples 6 and 7 were carried out in the same way as Synthetic example 1 except that different monomers from monomers (22 parts of methylmethacrylate and 7 parts of styrene) of Synthetic example 1 were used, to obtain powdered rubber graft copolymers (6c and 7c). The rubber graft copolymer obtained by manufacturing with monomers of "26.1 parts of methylmethacrylate and 2.9 parts of butylacrylate" was referred to as the powdered rubber graft copolymer (6c), and the rubber graft copolymer obtained by manufacturing with monomers of "10 parts of glycidylmethacrylate, 14 parts of methylmethacrylate and 5 parts of styrene" was referred to as the powdered rubber graft copolymer (7c). The remaining amounts of phosphorus, sulfur, calcium, and chlorine of the obtained powdered rubber graft copolymers (6c) and (7c) were 6c: 540 ppm, <5 ppm, 870 ppm, 360 ppm, 7c: 530 ppm, <5 ppm, 880 ppm, 420 ppm, respectively.

Synthetic Example 8

Synthesis of Rubber Graft Copolymer

Synthetic example 8 was carried out in the same way as Synthetic example 1 except that rubber polymer having 78 parts of the solid content was used in place of rubber polymer having 71 parts of the solid content, and monomers of "19.8 parts of methylmethacrylate, and 2.2 parts of butylacrylate" were used in place of monomers of "22 parts of methylmethacrylate and 7 parts of styrene" on the manufacture of the rubber graft copolymer, to obtain powdered rubber graft copolymers (8c). The remaining amounts of phosphorus, sulfur, calcium, and chlorine of the obtained powdered rubber graft copolymer (8c) were 570 ppm, <5 ppm, 930 ppm, 430 ppm, respectively.

Synthetic Example 9

Synthesis of Rubber Graft Copolymer

Synthetic example 9 was carried out in the same way as Synthetic example 1 except that washing with water was not carried out after coagulation with a solution of calcium chloride on the manufacture of the rubber graft copolymer, to obtain powdered rubber graft copolymers (9c). The remaining amounts of phosphorus, sulfur, calcium, and chlorine of the obtained powdered rubber graft copolymer (9c) were 1850 ppm, <10 ppm, 3200 ppm, 500 ppm, respectively.

Synthetic Example 10

Synthesis of Rubber Graft Copolymer

Synthetic example 10 was carried out in the same way as Synthetic example 1 except that different monomers from monomers of "22 parts of methylmethacrylate and 7 parts of styrene" of Synthetic example 1 were used on the manufacture of the rubber graft copolymer, to obtain powdered rubber graft copolymers (10c). The rubber graft copolymer manufactured with monomers of "0 parts of glycidylmethacrylate and 22 parts of methylmethacrylate and 7 parts of styrene" was referred to as the powdered rubber graft copolymer (10c).

The remaining amounts of phosphorus, sulfur, calcium, and chlorine of the obtained powdered rubber graft copolymer (10c) were 10c: 550 ppm, <5 ppm, 850 ppm, 350 ppm, respectively.

Synthetic Example 11

Synthesis of Rubber Graft Copolymer

Synthetic example 11 was carried out in the same way as Synthetic example 1 except that different monomers from monomers of "22 parts of methylmethacrylate and 7 parts of styrene" of Synthetic example 1 were used on the manufacture of the rubber graft copolymer, to obtain powdered rubber graft copolymers (11c). The rubber graft copolymer manufactured with monomers of "1.5 parts of glycidylmethacrylate and 20.5 parts of methylmethacrylate and 7 parts of styrene" was referred to as the powdered rubber graft copolymer (11c). The remaining amounts of phosphorus, sulfur, calcium, and chlorine of the obtained powdered rubber graft copolymer (11c) were 11c: 550 ppm, <5 ppm, 870 ppm, 400 ppm, respectively.

Synthetic Example 12

Synthesis of Rubber Graft Copolymer

Synthetic example 12 was carried out in the same way as Synthetic example 1 except that different monomers from monomers of "22 parts of methylmethacrylate and 7 parts of styrene" of Synthetic example 1 were used on the manufacture of the rubber graft copolymer, to obtain powdered rubber graft copolymers (12c). The rubber graft copolymer manufactured with monomers of "3 parts of glycidylmethacrylate and 19 parts of methylmethacrylate and 7 parts of styrene" was referred to as the powdered rubber graft copolymer (12c). The remaining amounts of phosphorus, sulfur, calcium, and chlorine of the obtained powdered rubber graft copolymer (12c) were 12c: 530 ppm, <5 ppm, 800 ppm, 400 ppm, respectively.

Synthetic Example 13

Synthesis of Rubber Graft Copolymer

Synthetic example 13 was carried out in the same way as Synthetic example 1 except that different monomers from monomers of "22 parts of methylmethacrylate and 7 parts of styrene" of Synthetic example 1 were used on the manufacture of the rubber graft copolymer, to obtain powdered rubber graft copolymers (13c). The rubber graft copolymer manufactured with monomers of "6 parts of glycidylmethacrylate and 16 parts of methylmethacrylate and 7 parts of styrene" was referred to as the powdered rubber graft copolymer (13c). The remaining amounts of phosphorus, sulfur, calcium, and chlorine of the obtained powdered rubber graft copolymer (13c) were 13c: 500 ppm, <5 ppm, 800 ppm, 420 ppm, respectively.

Synthetic Example 14

Synthesis of Rubber Graft Copolymer

Synthetic example 14 was carried out in the same way as Synthetic example 1 except that different monomers from monomers of "22 parts of methylmethacrylate and 7 parts of styrene" of Synthetic example 1 were used on the manufacture of the rubber graft copolymer, to obtain powdered rubber graft copolymers (14c). The rubber graft copolymer manufactured with monomers of "15 parts of glycidylmethacrylate and 7 parts of methylmethacrylate and 7 parts of styrene" was referred to as the powdered rubber graft copolymer (14c). The remaining amounts of phosphorus, sulfur, calcium, and chlorine of the obtained powdered rubber graft copolymer (14c) were 14c: 500 ppm, <5 ppm, 820 ppm, 440 ppm, respectively.

Synthetic Example 15

Synthesis of Rubber Graft Copolymer

Synthetic example 15 was carried out in the same way as Synthetic example 1 except that different monomers from monomers of "22 parts of methylmethacrylate and 7 parts of styrene" of Synthetic example 1 were used on the manufacture of the rubber graft copolymer, to obtain powdered rubber graft copolymers (15c). The rubber graft copolymer manufactured with monomers of "20 parts of glycidylmethacrylate and 2 parts of methylmethacrylate and 7 parts of styrene" was referred to as the powdered rubber graft copolymer (15c). The remaining amounts of phosphorus, sulfur, calcium, and chlorine of the obtained powdered rubber graft copolymer (15c) were 15c: 500 ppm, <5 ppm, 880 ppm, 480 ppm, respectively.

Synthetic Example 16

Synthesis of Rubber Graft Copolymer

Synthetic example 16 was carried out in the same way as Synthetic example 1 except that different monomers from monomers of "22 parts of methylmethacrylate and 7 parts of styrene" of Synthetic example 1 were used on the manufacture of the rubber graft copolymer, to obtain powdered rubber graft copolymers (16c). The rubber graft copolymer manufactured with monomers of "25 parts of glycidylmethacrylate and 0 parts of methylmethacrylate and 0 parts of styrene" was referred to as the powdered rubber graft copolymer (16c). The remaining amounts of phosphorus, sulfur, calcium, and chlorine of the obtained powdered rubber graft copolymer (16c) were 16c: 550 ppm, <5 ppm, 830 ppm, 460 ppm, respectively.

Synthetic Example 17

Synthesis of Rubber Graft Copolymer

Synthetic example 17 was carried out in the same way as Synthetic example 1 except that different monomers from monomers of "22 parts of methylmethacrylate and 7 parts of styrene" of Synthetic example 1 were used on the manufacture of the rubber graft copolymer, to obtain powdered rubber graft copolymers (17c). The rubber graft copolymer manufactured with monomers of "29 parts of glycidylmethacrylate and 0 parts of methylmethacrylate and 0 parts of styrene" was referred to as the powdered rubber graft copolymer (17c). The remaining amounts of phosphorus, sulfur, calcium, and chlorine of the obtained powdered rubber graft copolymer (17c) were 17c: 540 ppm, <5 ppm, 850 ppm, 400 ppm, respectively.

The thermoplastic resin compositions using the obtained rubber graft copolymers were prepared as shown in Tables 1 to 4. The results of the obtained evaluations were shown in Tables 1 to 4.

TABLE 1

|  |  |  | Test example 1 | Test example 2 | Test example 3 |
|---|---|---|---|---|---|
| Thermoplastic resin | Polycarbonate resin |  | 100 parts by mass | 100 parts by mass | 100 parts by mass |
| Rubber graft copolymer | Synthetic Example | 1c | 5 parts by mass |  |  |
|  |  | 6c |  | 5 parts by mass |  |
|  |  | 8c |  |  | 5 parts by mass |
| Composition of rubber graft copolymer |  |  |  |  |  |
| Core layer | Butadiene |  | 71 parts by mass | 71 parts by mass | 78 parts by mass |
| Shell layer | Glycidyl methacrylate |  |  |  |  |
|  | Methyl methacrylate |  | 22 parts by mass | 26.1 parts by mass | 19.8 parts by mass |
|  | Butyl acrylate |  |  | 2.9 parts by mass | 2.2 parts by mass |
|  | Styrene |  | 7 parts by mass |  |  |
| Amount of shell layer based on 100 parts by mass of core layer |  |  | 40.8 parts by mass | 40.8 parts by mass | 28.2 parts by mass |
| Amount of (meth) acrylate having epoxy group based on 100 parts by mass of rubber graft copolymer |  |  | 0 parts by mass | 0 parts by mass | 0 parts by mass |
| Amount of (meth) acrylate having epoxy group based on 100 parts by mass of shell layer |  |  | 0 parts by mass | 0 parts by mass | 0 parts by mass |
| Manufacture condition of rubber graft copolymer | Polymerizable emulsifier |  | Phosphate※1 | Phosphate※1 | Phosphate※1 |
|  | pH of polymerization |  | 6.5 to 7.5 | 6.5 to 7.5 | 6.5 to 7.5 |
|  | Stabilizer |  | IRGANOX-1076 | IRGANCX-1076 | IRGANOX-1076 |
| Amount of remaining element of rubber graft copolymer (ppm) | Phosphorus |  | 550 | 540 | 570 |
|  | Sulfur |  | <5 | <5 | <5 |
|  | Calcium |  | 850 | 870 | 930 |
|  | Chlorine |  | 350 | 360 | 430 |
| Rubber graft copolymer/thermoplastic resin (mass ratio) |  |  | 5/100 | 5/100 | 5/100 |
| Molding temperature for thermoplastic resin |  |  | 300° C. | 300° C. | 300° C. |
| Izod impact strength (kJ/m²) | 23° C. |  | 63.8 | 62.9 | 61.8 |
|  | −30° C. |  | 55.1 | 54.7 | 57.1 |
| Color tone | YI |  | −0.3 | 0.1 | 0.3 |
| Heat stability YI (dry oven at 120° C.) | 0 hours |  | −0.3 | 0.1 | 0.3 |
|  | 72 hours |  | 7 | 6 | 9 |
|  | 144 hours |  | 12 | 11 | 15 |
| Wet heat aging 23° C. Izod (90° C. × 95% RH) (kJ/m²) | 0 hours |  | 63.8 | 62.9 | 61.8 |
|  | 500 hours |  | 55.1 | 56.1 | 54.5 |
|  | 1000 hours |  | 42.5 | 42.9 | 43.8 |
|  | 1500 hours |  | 34.1 | 35.1 | 37.7 |

Polycarbonate resin: Panlite ® L-1225 WX (TEIJIN LIMITED)
※1 Polyoxyethylenealkylether phosphate salt (alkyl group having 12 carbon atoms, and 4 units of ethyleneoxide)

TABLE 2

|  |  |  | Test example 4 | Test example 5 | Test example 6 | Test example 7 | Test example 8 |
|---|---|---|---|---|---|---|---|
| Thermoplastic resin | Polycarbonate resin |  | 100 parts by mass | 100 parts by mass | 100 parts by mass | 100 parts by mass | 100 parts by mass |
| Rubber graft copolymer | Synthetic Example | 2c | 5 parts by mass |  |  |  |  |
|  |  | 3c |  | 5 parts by mass |  |  |  |
|  |  | 4c |  |  | 5 parts by mass |  |  |
|  |  | 5c |  |  |  | 5 parts by mass |  |
|  |  | 9c |  |  |  |  | 5 parts by mass |
| Composition of rubber graft copolymer |  |  |  |  |  |  |  |
| Core layer | Butadiene |  | 71 parts by mass | 71 parts by mass | 71 parts by mass | 71 parts by mass | 71 parts by mass |
| Shell layer | Methyl methacrylate |  | 22 parts by mass | 22 parts by mass | 22 parts by mass | 22 parts by mass | 22 parts by mass |
|  | Butyl acrylate |  |  |  |  |  |  |
|  | Styrene |  | 7 parts by mass | 7 parts by mass | 7 parts by mass | 7 parts by mass | 7 parts by mass |

TABLE 2-continued

|  |  | Test example 4 | Test example 5 | Test example 6 | Test example 7 | Test example 8 |
|---|---|---|---|---|---|---|
| | Amount of shell layer based on 100 parts by mass of core layer | 40.8 parts by mass | 40.8 parts by mass | 40.8 parts by mass | 40.8 parts by mass | 40.8 parts by mass |
| | Amount of (meth) acrylate having epoxy group based on 100 parts by mass of rubber graft copolymer | 0 parts by mass | 0 parts by mass | 0 parts by mass | 0 parts by mass | 0 parts by mass |
| | Amount of (meth) acrylate having epoxy group based on 100 parts by mass of shell layer | 0 parts by mass | 0 parts by mass | 0 parts by mass | 0 parts by mass | 0 parts by mass |
| Manufacture condition of rubber graft copolymer | Polymerizable emulsifier | Sulfonate※2 | Carboxylic acid※3 | Phosphate※1 | Phosphate※1 | Phosphate※1 |
| | pH of polymerization | 6.5 to 7.5 | 6.5 to 7.5 | 3.5 to 4.5 | 9.5 to 10.5 | 6.5 to 7.5 |
| | Stabilizer | IRGANOX-1076 | IRGANOX-1076 | IRGANOX-1076 | IRGANOX-1076 | IRGANOX-1076 |
| Amount of remaining element of rubber graft copolymer (ppm) | Phosphorus | <5 | <5 | 540 | 550 | 1850 |
| | Sulfur | 1100 | <5 | <5 | <5 | 10< |
| | Calcium | 900 | 1020 | 900 | 890 | 3200 |
| | Chlorine | 350 | 1230 | 410 | 400 | 500 |
| Rubber graft copolymer/thermoplastic resin (mass ratio) | | 5/100 | 5/100 | 5/100 | 5/100 | 5/100 |
| Molding temperature for thermoplastic resin | | 300° C. | 300° C. | 300° C. | 300° C. | 300° C. |
| Izod impact strength (kJ/m$^2$) | 23° C. | 61.7 | 61.2 | 63.1 | 63.4 | 63.1 |
| | −30° C. | 52.4 | 22.8 | 52.1 | 49.1 | 49.5 |
| Color tone | YI | 4.5 | 35.5 | 1.5 | 3.8 | −0.2 |
| Heat stability YI (dry oven at 120° C.) | 0 hours | 4.5 | 35.5 | 1.5 | 3.8 | −0.2 |
| | 72 hours | 22 | 125 | 12 | 16 | 9 |
| | 144 hours | 40 | 180 | 22 | 31 | 15 |
| Wet heat aging 23° C. Izod (90° C. × 95% RH) (kJ/m$^2$) | 0 hours | 61.7 | 61.2 | 63.1 | 63.4 | 63.1 |
| | 500 hours | 50.5 | 5.5 | 49.5 | 41.4 | 49.8 |
| | 1000 hours | 20.1 | 1.3 | 29.8 | 9.8 | 20.8 |
| | 1500 hours | 1.1 | 0.9 | 10.1 | 5.5 | 1.2 |

Polycarbonate resin: Panlite ® L-1225 WX (TEIJIN LIMITED)

※1 Polyoxyethylenealkylether phosphate salt (alkyl group having 12 carbon atoms, 4 units of ethyleneoxide)

※2 Dodecylbenzenesulfonate

※3 Partially hydrogenated tallow fatty acid potassium.

TABLE 3

| | | | Test example 10 | Test example 11 | Test example 12 | Test example 13 | Test example 14 | Test example 15 | Test example 16 | Test example 17 | Test example 18 | Test example 19 |
|---|---|---|---|---|---|---|---|---|---|---|---|---|
| Thermoplastic resin | Polycarbonate resin | | 70 parts by mass | 70 parts by mass | 70 parts by mass | 70 parts by mass | 70 parts by mass | 70 parts by mass | 70 parts by mass | 70 parts by mass | 70 parts by mass | 70 parts by mass |
| | Polylactic acid | | 30 parts by mass | 30 parts by mass | 30 parts by mass | 30 parts by mass | 30 parts by mass | 30 parts by mass | 30 parts by mass | 30 parts by mass | 30 parts by mass | 30 parts by mass |
| Rubber graft copolymer | Synthetic Example | 10c | — | 3 parts by mass | | | | | | | | |
| | | 11c | | | 5 parts by mass | 3 parts by mass | | | | | | |
| | | 12c | | | | | 5 parts by mass | 3 parts by mass | 5 parts by mass | | | |
| | | 13c | | | | | | | | 3 parts by mass | 5 parts by mass | |
| | | 7c | | | | | | | | | | 3 parts by mass |
| | Composition of rubber graft copolymer | | | | | | | | | | | |
| | Core layer | Butadiene | — | 71 parts by mass | 71 parts by mass | 71 parts by mass | 71 parts by mass | 71 parts by mass | 71 parts by mass | 71 parts by mass | 71 parts by mass | 71 parts by mass |
| | Shell layer | Glycidyl methacrylate | — | 0 parts by mass | 0 parts by mass | 1.5 parts by mass | 1.5 parts by mass | 3 parts by mass | 3 parts by mass | 6 parts by mass | 6 parts by mass | 10 parts by mass |
| | | Methyl methacrylate | — | 22 parts by mass | 22 parts by mass | 20.5 parts by mass | 20.5 parts by mass | 19 parts by mass | 19 parts by mass | 16 parts by mass | 16 parts by mass | 14 parts by mass |
| | | Styrene | — | 7 parts by mass | 7 parts by mass | 7 parts by mass | 7 parts by mass | 7 parts by mass | 7 parts by mass | 7 parts by mass | 7 parts by mass | 7 parts by mass |
| | Amount of shell layer based on 100 parts by mass of core layer | | — | 40.8 parts by mass | 40.8 parts by mass | 40.8 parts by mass | 40.8 parts by mass | 40.8 parts by mass | 40.8 parts by mass | 40.8 parts by mass | 40.8 parts by mass | 40.8 parts by mass |
| | Amount of (meth) acrylate having epoxy group based on 100 parts by mass of rubber graft copolymer | | — | 0 parts by mass | 0 parts by mass | 1.5 parts by mass | 1.5 parts by mass | 3 parts by mass | 3 parts by mass | 6 parts by mass | 6 parts by mass | 10 parts by mass |
| | Amount of (meth) acrylate having epoxy group based on 100 parts by mass of shell layer | | — | 0 parts by mass | 0 parts by mass | 5.2 parts by mass | 5.2 parts by mass | 10.3 parts by mass | 10.3 parts by mass | 20.7 parts by mass | 20.7 parts by mass | 34.5 parts by mass |
| | Manufacture condition of rubber graft copolymer | Polymerizable emulsifier | Phosphate X1 | Phosphate X1 | Phosphate X1 | Phosphate X1 | Phosphate X1 | Phosphate X1 | Phosphate X1 | Phosphate X1 | Phosphate X1 | Phosphate X1 |
| | | pH of polymerization | 6.5 to 7.5 | 6.5 to 7.5 | 6.5 to 7.5 | 6.5 to 7.5 | 6.5 to 7.5 | 6.5 to 7.5 | 6.5 to 7.5 | 6.5 to 7.5 | 6.5 to 7.5 | 6.5 to 7.5 |
| | | Stabilizer | IRGANOX-1076 | IRGANOX-1076 | IRGANOX-1076 | IRGANOX-1076 | IRGANOX-1076 | IRGANOX-1076 | IRGANOX-1076 | IRGANOX-1076 | IRGANOX-1076 | IRGANOX-1076 |
| | Amount of remaining element of rubber graft copolymer (ppm) | Phosphorus | — | 550 | 550 | 550 | 550 | 530 | 530 | 500 | 500 | 540 |
| | | Sulfur | — | <5 | <5 | <5 | <5 | <5 | <5 | <5 | <5 | <5 |
| | | Calcium | — | 850 | 850 | 870 | 870 | 800 | 800 | 800 | 800 | 820 |
| | | Chlorine | — | 350 | 350 | 400 | 400 | 400 | 400 | 420 | 420 | 450 |

TABLE 3-continued

| | Test example 10 | Test example 11 | Test example 12 | Test example 13 | Test example 14 | Test example 15 | Test example 16 | Test example 17 | Test example 18 | Test example 19 |
|---|---|---|---|---|---|---|---|---|---|---|
| Rubber graft copolymer/thermoplastic resin (mass ratio) | — | 3/100 | 5/100 | 3/100 | 5/100 | 3/100 | 5/100 | 3/100 | 5/100 | 3/100 |
| Molding temperature for thermoplastic resin | 250° C. | 250° C. | 250° C. | 250° C. | 250° C. | 250° C. | 250° C. | 250° C. | 250° C. | 250° C. |
| Izod impact strength (kJ/m²) 23° C. | 8.5 | 75.2 | 75.2 | 34.5 | 58.9 | 63.8 | 70.2 | 64.5 | 72.1 | 68.3 |
| Appearance of molded product visual test of surface condition | X | X | X | X | Δ | ○- | ○- | ○- | ○ | ○ |
| MFR(220° C., 2.16 Kg) g/10 min | 2 | 1.5 | 1.4 | 1.3 | 1.2 | 1.3 | 1.1 | 1.2 | 0.9 | 1.2 |

Polycarbonate resin: Panlite® L-1225 WX (TEIJIN LIMITED) ethyleneoxide)
Polylactic acid: TERRAMAC (UNITIKA, LTD.)
※1 Polyoxyethylenealkylether phosphate salt (alkyl group having 12 carbon atoms, 4 units of

TABLE 4

| | | Test example 9 | Test example 20 | Test example 21 | Test example 22 | Test example 23 | Test example 24 | Test example 25 | Test example 26 | Test example 27 |
|---|---|---|---|---|---|---|---|---|---|---|
| Thermoplastic resin | Polycarbonate resin | 70 parts by mass | 70 parts by mass | 70 parts by mass | 70 parts by mass | 70 parts by mass | 70 parts by mass | 70 parts by mass | 70 parts by mass | 70 parts by mass |
| | Polylactic acid | 30 parts by mass | 30 parts by mass | 30 parts by mass | 30 parts by mass | 30 parts by mass | 30 parts by mass | 30 parts by mass | 30 parts by mass | 30 parts by mass |
| Rubber graft copolymer | Synthetic Example 7c | 5 parts by mass | | | | | | | | |
| | 14c | | 3 parts by mass | 5 parts by mass | | | | | | |
| | 15c | | | | 3 parts by mass | 5 parts by mass | | | | |
| | 16c | | | | | | 3 parts by mass | 5 parts by mass | 3 parts by mass | 5 parts by mass |
| | 17c | | | | | | | | | |
| Composition of rubber graft copolymer | | | | | | | | | | |
| Core layer | Butadiene | 71 parts by mass | 71 parts by mass | 71 parts by mass | 71 parts by mass | 71 parts by mass | 71 parts by mass | 71 parts by mass | 71 parts by mass | 71 parts by mass |
| Shell layer | Glycidyl methacrylate | 10 parts by mass | 15 parts by mass | 15 parts by mass | 20 parts by mass | 20 parts by mass | 25 parts by mass | 25 parts by mass | 29 parts by mass | 29 parts by mass |
| | Methyl methacrylate | 14 parts by mass | 7 parts by mass | 7 parts by mass | 2 parts by mass | 2 parts by mass | 0 parts by mass | 0 parts by mass | 0 parts by mass | 0 parts by mass |
| | Styrene | 5 parts by mass | 7 parts by mass | 7 parts by mass | 7 parts by mass | 7 parts by mass | 0 parts by mass | 0 parts by mass | 0 parts by mass | 0 parts by mass |
| Amount of shell layer based on 100 parts by mass of core layer | | 40.8 parts by mass | 40.8 parts by mass | 40.8 parts by mass | 40.8 parts by mass | 40.8 parts by mass | 40.8 parts by mass | 40.8 parts by mass | 40.8 parts by mass | 40.8 parts by mass |
| Amount of (meth) acrylate having epoxy group based on 100 parts by mass of rubber graft copolymer | | 10 parts by mass | 15 parts by mass | 15 parts by mass | 20 parts by mass | 20 parts by mass | 25 parts by mass | 25 parts by mass | 29 parts by mass | 29 parts by mass |
| Amount of (meth) acrylate having epoxy group based on 100 parts by mass of shell layer | | 34.5 parts by mass | 51.7 parts by mass | 51.7 parts by mass | 69 parts by mass | 69 parts by mass | 100 parts by mass | 100 parts by mass | 100 parts by mass | 100 parts by mass |
| Manufacture condition of rubber graft copolymer | Polymerizable emulsifier | Phosphate※1 | Phosphate※1 | Phosphate※1 | Phosphate※1 | Phosphate※1 | Phosphate※1 | Phosphate※1 | Phosphate※1 | Phosphate※1 |
| | pH of polymerization | 6.5 to 7.5 | 6.5 to 7.5 | 6.5 to 7.5 | 6.5 to 7.5 | 6.5 to 7.5 | 6.5 to 7.5 | 6.5 to 7.5 | 6.5 to 7.5 | 6.5 to 7.5 |
| | Stabilizer | IRGANOX-1076 | IRGANOX-1076 | IRGANOX-1076 | IRGANOX-1076 | IRGANOX-1076 | IRGANOX-1076 | IRGANOX-1076 | IRGANOX-1076 | IRGANOX-1076 |
| Amount of remaining element of rubber graft copolymer (ppm) | Phosphorus | 540 | 500 | 500 | 500 | 500 | 550 | 550 | 540 | 540 |
| | Sulfur | <5 | <5 | <5 | <5 | <5 | <5 | <5 | <5 | <5 |
| | Calcium | 820 | 820 | 820 | 880 | 880 | 830 | 830 | 850 | 850 |
| | Chlorine | 450 | 440 | 440 | 480 | 480 | 460 | 460 | 400 | 400 |
| Rubber graft copolymer/thermoplastic resin (mass ratio) | | 5/100 | 3/100 | 5/100 | 3/100 | 5/100 | 3/100 | 5/100 | 3/100 | 5/100 |
| Molding temperature for thermoplastic resin | | 250° C. | 250° C. | 250° C. | 250° C. | 250° C. | 250° C. | 250° C. | 250° C. | 250° C. |
| Izod impact strength (kJ/m²) 23° C. | | 74.9 | 69.3 | 74.3 | 65.4 | 76.2 | 62.7 | 71.0 | 28.1 | 48.1 |
| Appearance of molded product visual test of surface condition | | ◎ | ◎ | ◎ | ◎ | ◎ | ◎ | ◎ | ○ | ◎ |
| MFR(220° C., 2.16 Kg) g/10 min | | 0.7 | 1.1 | 0.6 | 1.0 | 0.6 | 1.1 | 0.7 | 1.5 | 1.0 |

Polycarbonate resin: Panlite ® L-1225 WX (TEIJIN LIMITED)
Polylactic acid: TERRAMAC (UNITIKA. LTD.)
※1 Polyoxyethylenealkylether phosphate salt (alkyl group having 12 carbon atoms, 4 units of ethyleneoxide)

As shown in Tables 1 and 2, the thermoplastic resin compositions using the rubber graft copolymers of the present invention exhibited good heat stability and small changes of color tone (small variation of YI value) after the storage at the high temperature. Further, the retention rate of the Izod strength after the wet heat aging test was high, and the decrease of the physical properties was also little.

In addition, as shown in Tables 3 and 4, the polycarbonate resin/polylactic acid resin alloy compositions using the rubber graft copolymers of the present invention exhibited not only good impact resistance also uniform condition of the surface due to the decrease of the pearl gloss, so that the compatibility (dispersibility) of the polycarbonate resin and the polylactic acid resin is improved.

INDUSTRIAL APPLICABILITY

The thermoplastic resin composition of the present invention can be utilized in various applications, for example, electric and electronic applications such as a personal computer, a liquid crystal display, a projector, a PDA, a printer, a copy machine, a facsimile, a video camera, a digital camera, a cellular phone (smart phone), a portable audio device, a game machine, a DVD recorder, a microwave oven, a rice cooker; building applications such as a light transmitting plate for road, a lighting window, a carport, a lens for lighting, a cover for lighting, a siding for building, and a door; vehicle applications such as a handle, a shift lever, a vibration absorber for an automobile, and a window, a display, a light, a panel of driving seat for train, and the like.

The invention claimed is:

1. A rubber graft copolymer comprising a core layer containing a rubber polymer and a shell layer grafted on the core layer satisfying all of the following (1) to (7):
   (1) the rubber graft copolymer polymerized under the presence of an alkaline metal salt of a phosphate compound,
   (2) the rubber graft copolymer obtained by contacting a solution containing an alkaline earth metal chloride to a latex containing the rubber graft copolymer obtained by the emulsion polymerization to coagulate the copolymer,
   (3) the rubber graft copolymer in which the phosphate compound remains as an alkaline earth metal salt in the rubber graft copolymer, the remaining amount of the alkaline earth metal salt of the phosphate compound is 400 ppm or more and 3000 ppm or less as an alkaline earth metal on a mass basis,
   (4) the rubber graft copolymer obtained by polymerizing at conditions of pH of 5.0 to 9.0,
   (5) the rubber graft copolymer in which the rubber polymer is a polybutadiene or a poly (butadiene-styrene),
   (6) a concentration of monomers used in the polymerization of the shell layer is (i) 60 to 80% by mass of methyl methacrylate and 20 to 40% by mass of styrene, or (ii) 70 to 99% by mass of methyl methacrylate and 1 to 30% by mass of butylacrylate, or (iii) 30 to 40% by mass of glycidyl methacrylate, 45 to 55% by mass of methylmethacrylate, and 5 to 25% by mass of styrene, per 100% by mass of monomers constituting the shell layer, and
   (7) the alkaline metal salt of the phosphate compound is polyoxyalkylene alkyl phenyl ether phosphate salt or polyoxyalkylene alkyl ether phosphate salt.

2. The rubber graft copolymer according to claim 1, wherein the content of phosphorus is 10 ppm or more on a mass basis.

3. The rubber graft copolymer according to claim 1, wherein the rubber graft copolymer is washed by water and/or a solvent in the step after the coagulation.

4. The rubber graft copolymer according to claim 1, wherein the alkaline earth metal chloride is calcium chloride or magnesium chloride.

5. The rubber graft copolymer according to claim 1, wherein the concentration of monomers used in the polymerization of the shell layer is (i) 60 to 80% by mass of methyl methacrylate and 20 to 40% by mass of styrene, or (iii) 30 to 40% by mass of glycidyl methacrylate, 45 to 55% by mass of methylmethacrylate, and 5 to 25% by mass of styrene, per 100% by mass of monomers constituting the shell layer.

6. A thermoplastic resin composition comprising the rubber graft copolymer as defined in claim 1, and a thermoplastic resin.

* * * * *